United States Patent
Karpel (10) Patent No.: US 12,215,815 B2
(45) Date of Patent: Feb. 4, 2025

(54) TRANSFERRING APPARATUS FOR PIPELINE AND ELECTRICITY WIRING INSERTION INTO RESIDENTIAL SECURED SPACES

(71) Applicant: Eran Karpel, Be'er Ya'akov (IL)

(72) Inventor: Eran Karpel, Be'er Ya'akov (IL)

( * ) Notice: Subject to any disclaimer, the term of this patent is extended or adjusted under 35 U.S.C. 154(b) by 0 days.

(21) Appl. No.: 16/509,225

(22) Filed: Jul. 11, 2019

(65) Prior Publication Data

US 2020/0041046 A1 Feb. 6, 2020

(51) Int. Cl.
*F16L 5/08* (2006.01)
*H02G 3/04* (2006.01)
*H02G 3/22* (2006.01)

(52) U.S. Cl.
CPC .............. *F16L 5/08* (2013.01); *H02G 3/0481* (2013.01); *H02G 3/22* (2013.01)

(58) Field of Classification Search
CPC ...... F16L 5/00; F16L 5/02; F16L 5/08; H02G 3/22; H02G 3/0481
See application file for complete search history.

(56) References Cited

U.S. PATENT DOCUMENTS

| | | | | |
|---|---|---|---|---|
| 5,505,499 A | * | 4/1996 | Wallbank | F16L 5/02 285/139.1 |
| 9,722,404 B2 | * | 8/2017 | Beele | H02G 3/22 |
| 2004/0080119 A1 | * | 4/2004 | Goll | H02G 15/013 277/607 |
| 2007/0097667 A1 | * | 5/2007 | Armstrong | H02G 3/088 362/101 |
| 2007/0273107 A1 | * | 11/2007 | Beele | F16L 5/04 277/607 |
| 2010/0059941 A1 | * | 3/2010 | Beele | F16L 5/10 277/606 |
| 2020/0161848 A1 | * | 5/2020 | Bielen | H02G 15/013 |

FOREIGN PATENT DOCUMENTS

| | | | | |
|---|---|---|---|---|
| DE | 3916752 A1 | * | 11/1990 | H02G 3/22 |
| EP | 1479958 A1 | * | 11/2004 | F16L 5/08 |
| GB | 651063 A | * | 3/1951 | F16L 5/08 |
| KR | 2019120897 A | * | 10/2019 | |

* cited by examiner

*Primary Examiner* — Babajide A Demuren
(74) *Attorney, Agent, or Firm* — Maxwell L. Minch Esq. PA; Maxwell Minch (57) ABSTRACT

This invention is directed to a novel transferring apparatus for transfer of pipelines and/or wires into a shelter, while keeping the shelter sealed and impermeable for gas, liquids, blast over pressure, resist motive force, and blast reflected pressure. Embodiments of the invention enable entry of content into the shelter only through the pipe.

21 Claims, 12 Drawing Sheets

TRANSFERRING APPARATUS FOR PIPELINE AND ELECTRICITY WIRING INSERTION INTO RESIDENTIAL SECURED SPACES

CROSS REFERENCE TO RELATED APPLICATIONS

This applications claims priority to Israeli Patent Application Serial No. IL260942, filed on Aug. 1, 2018, the disclosure of which is hereby incorporated by reference herein in its entirety and commonly owned.

TECHNOLOGICAL FIELD AND BACKGROUND

The invention is related to shelters in general, and to apparatus for pipeline and wiring insertion into shelters that allows maintaining impermeability of the shelter to gas, liquids and blast over pressure entrance and the stability and resistance of the shelter to motive force, shrapnel penetration and blast reflected pressure.

Secured spaces are well known in the art and used in countries that suffer a sensitive security mode. They are also used for storage of weapon, and else. Many secured spaces are needs to be sealed for gas entrance and shrapnel penetration, and further to be stable and resistance to motive force and blast reflected pressure. As a standard, in Israel, the walls of secured spaces are made of reinforced concrete, that comprise either a net or rods of steel within the concrete for creating a strong infra structure of the walls and allows its flexibility, strength and stability to motive force, blast reflected pressure and penetration of shrapnel into the shelter in the event of an attack on the building that the secured spaces are within. Thus, it is always a challenge to maintain the infrastructure of the reinforces concrete walls and maintain the impermeability to gas, liquid and blast over pressure when inserting wiring of various systems, such as air condition, electric systems, communication systems, water system and the like, into the secured spaces that requires transfer of wiring through the sealed structure of the walls.

There are several solutions available in the market. One main solution is usage of a Multi Cable Transit (MCT) device that allows inserting pipes in diameter of 4 inches or various bigger round and rectangular pipes. U.S. Pat. No. 5,505,499 (A) [WALLBANK GRAHAM T). One main drawback of MCT devices is that it disturbs the reinforced concrete infrastructure as its dimensions extend beyond the standard dimensions of the inner steel net/rods within the walls (a size of 10 cm between the centers of the steel/iron rods). Thus, usage of MCT devices force cutting of the iron rods at the area of installation of the device. That weakens the reinforced concrete wall twice, once at the area of the hole created for transferring the wiring; and a second time, due to the cutting of the steel/iron rods/net within the walls. In addition, because the holes created in the walls for insertion of the MCT device are significantly larger than an average shrapnel size, there is a chance and danger that shrapnel will pass through the pipeline and into the protected space.

One of the solutions available in the market is based on steel made board with sealed main opening positioned onto the board that serves as a general sleeve to exit all wiring and piping. This structure of one main opening is not stable enough and limiting in positioning of the pipes and wires as it is dictated by the position of the main opening, and also weakening the reinforced concrete twice, and enable shrapnel entrance as described above.

Thus, there is a need in the art for a better solution that allows insertion of pipeline and wiring into residential secured space that maintains the infrastructure of the reinforced concrete wall completed, strong and sealed.

SUMMARY OF THE INVENTION

The present invention, in one main aspect is directed to transferring device capable of transferring piping and wires of various systems, such as electricity, communication wire, air conditioning, and water into a shelter, with minimal damage to the reinforced concrete wall of the shelter so as to maintain the shelter impermeability to gas, liquids and blast over pressure and the resistance and stability of the walls to motive force, shrapnel penetration and blast reflected pressure.

The term "shelter" as used herein is directed to an underground or ground structure designed for civil defense against conventional weapons such as shells, missiles, aerial attacks, etc. Some shelters have an infrastructure for protection against non-conventional weapons including biological and chemical weapons. Most shelters are built from reinforced concrete that is among the most powerful substances that exist. The term shelter as used herein also includes the terms: protective spaces, clean room, safe room, secured space, and residential secure space, that may be used hereinafter interchangeably.

The term "wall" as used herein includes peripheral walls, floor and ceiling of a room.

Thus, in one main aspect of the invention, a transferring apparatus for transfer of pipelines and/or wires into a shelter, while keeping the shelter sealed and impermeable for gas, liquids, blast over pressure, resist motive force, and blast reflected pressure is provided. The apparatus comprising: at least one pipe integrated into a shelter's wall for transferring trough it at least one of a gas pipeline, a water pipeline, and wires from the surroundings into the shelter; at least one sealing gasket configured to be assembled on at least one opening of said pipe; the sealing gasket is made of a flexible material, with an opening along the pipeline and wiring pathway that are inserted and passing through this opening, said gasket has a trimmed changeable angle slope at one side and flat base from the other side; at least one fastening plate for fastening said sealing gasket toward the opening of said pipe and the shelter's wall surrounding the pipe; and at least one fastening screw inserted from the outer side of the shelter's wall inward or vice versa, and secured by at least one nut for tightening said sealing gasket and fastening plate over the opening of said pipe; wherein, the pressure created by said sealing gasket, tightening plate and fastening screw over the pipes' opening enables entry of content into the shelter only through the pipe.

In a preferred embodiment, the shelter's wall is made of concrete, and the pipe length is determined according to the concrete wall thickness of the shelter. However, other strong material can also be applied to compose the shelters' wall.

The pipe may be configured to transfer either one of gas pipeline, drainage pipeline, water pipeline, and wires pipeline. The wires may be either one of electricity or communication wires. In some embodiment more than one wire may be inserted in a single pipeline.

In accordance with embodiments of the invention, the transferring apparatus may further comprise at least one frame integrated into the shelter's wall, said frame comprise holes for positioning of the at least one pipe through it for gathering more than one pipe in a predetermined proximity to each other. The frame may be positioned at the entry side of the shelter's wall and an additional frame may be positioned at the exit side of the shelter's wall facing the inner space of the shelter such that, each pipe is inserted through dedicated holes in each of the frames for creating an arranged transferring structure within the shelters' wall. In some specific embodiments, the frames comprise at least four holes for positioning of four pipes for air condition system installation within the shelter. In such embodiments, the four pipes are configured to transfer two pipelines for gas, one pipeline for electricity wires and one pipeline for drainage.

The sealing gasket 132 is preferably made of a flexible material, with an opening along the pipeline and wiring pathway that are inserted and passing through this opening, the gasket has a trimmed changeable angle slope at one side and flat base from the other side. Alternatively, the gasket has a trimmed slope in a changeable angle on both sides.

In some additional embodiments of the invention, the transferring apparatus according to any one of the embodiments described above, is positioned in between the metal rods of a reinforced concrete wall of a shelter, thereby maintaining the inner structure of said reinforced concrete wall whole.

In further embodiments, the transferring apparatus may comprise a plurality of pipes gathered by an exit frame positioned at the inner side of the reinforced concrete wall toward the inner space of the shelter for installation of communication and electrical wires for multiple systems within the shelter.

Yet, in additional embodiments of the invention, the transferring apparatus may comprise a steal base that is preinstalled in a shelter configured to allow transfer of various pipelines, an exit frame with multiple holes for passage of each pipeline positioned at the inner side of the reinforced concrete wall toward the inner space of the shelter, and secured to the steal base by plurality of tightening screws, wherein, each pipeline exiting from the holes in exit frame is covered by a sealing gasket that is further tightened by a tightening plate and fastened by screws locked with nuts. The present invention is also directed to a method for transferring pipelines and/or wires into a shelter, while keeping the shelter sealed and impermeable for gas, liquids, blast over pressure, resist motive force, and blast reflected pressure, said method comprising: (a) Inserting at least one pipe into a shelter's wall concrete for transferring trough it at least one of a gas pipeline, a water pipeline, and wires from the surroundings into the shelter; (b) Assembling at least one sealing gasket on at least one opening of said pipe; said sealing gasket is made of a flexible material, with an opening along the pipeline and wiring pathway that are inserted and passing through this opening, said gasket has a trimmed changeable angle slope at one side and flat base from the other side; (c) Positioning at least one fastening plate onto said sealing gasket for fastening toward the opening of said pipe and the shelter's wall surrounding the pipe; and (d) Inserting at least one fastening screw from the outer side of the shelter's wall inward or vice versa into the fastening plate, and securing it by at least one nut for tightening the sealing gasket and the fastening plate over the opening of said pipe; and wherein, the pressure created by said sealing gasket, tightening plate and fastening screw over the pipes' opening enables entry of content into the shelter only through the pipe.

BRIEF DESCRIPTION OF THE DRAWINGS

Examples illustrative of embodiments of the disclosure are described below with reference to figures attached hereto. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings.

The figures (FIGS.) are listed below.

FIGS. 5A-5D are schematic illustrations of additional examples of transferring apparatus for transfer of constellation of air condition pipeline, wiring and drainage in accordance with embodiments of the invention, wherein.

FIGS. 6A-6B are schematic illustrations of two optional implementation of the transferring apparatus of the invention for transferring wires and pipelines of various systems and functionalities into a shelter, wherein FIG. 6A illustrated apparatus suitable for installation of communication wires and electricity for multiple systems in a shelter.

DETAILED DESCRIPTION OF EMBODIMENTS

In the following description, various aspects of a novel apparatus for transfer of wiring of air condition pipeline, wiring and drainage for installation in shelters that allows maintenance of impermeability for gas, liquids and blast over pressure and motive force, shrapnel penetration and blast reflected pressure, will be described. For the purpose of explanation, specific configurations and details are set forth in order to provide a thorough understanding of the invention.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment. Furthermore, it should be understood that the disclosure can be carried out or practiced in various ways, and that the disclosure can be implemented in embodiments other than the exemplary ones described herein below. The descriptions, examples and materials presented in the description, as well as in the claims, should not be construed as limiting, but rather as illustrative.

The present invention provides a solution that can prevent shrapnel from penetrating into shelters as the transferring apparatus provided herein maintains the reinforced concrete structure whole. The pipes that serve for transferring wires and pipelines are integrated into the shelter wall and covered by concrete. Additionally, the dimensions of the transferring apparatus of this invention in compliance with the dimensions determined by the standard for the spaces between the metal rods creating the inner structure of the reinforced concrete wall of the shelter. In addition to the above, each pipe is sealed by a proprietary gasket that seals and secures the shelter from dangerous conventional and non-conventional materials, poisoned gas, liquids and blast over pressure and motive force and blast reflected pressure. Also, in some embodiments of the invention the transferring apparatus provided herein allows to connect a vertical pipe that can move horizontally along the shelter wall/ceiling.

Reference is now made to the figures.

Figure 1A:
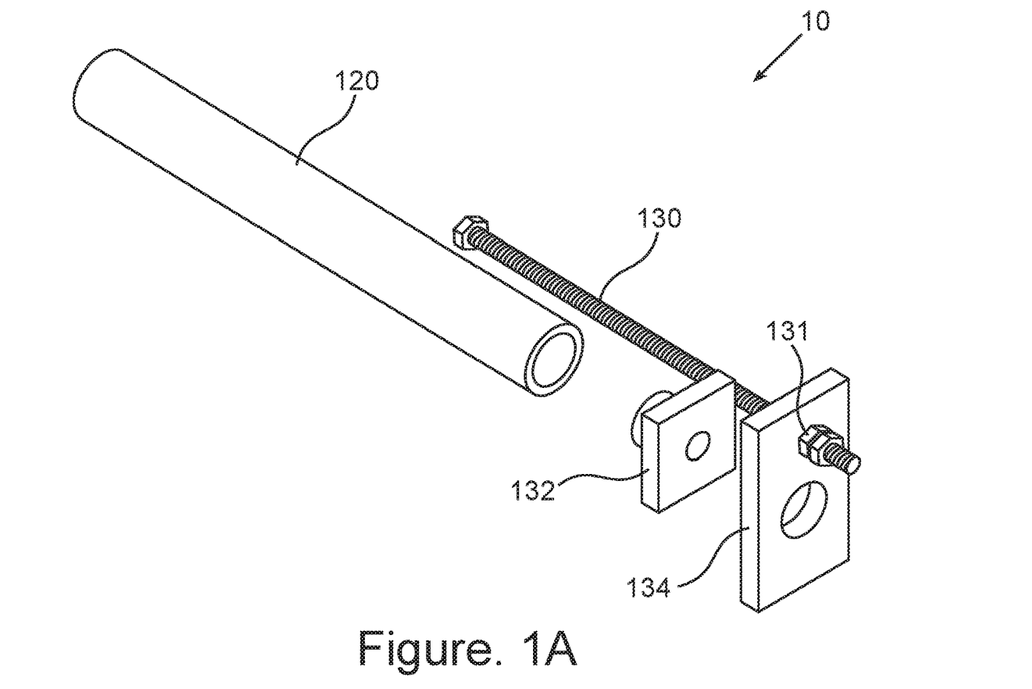
FIG. 1A is a schematic isometric view illustration of a basic transferring apparatus in accordance with embodiments of the invention.

FIG. 1A is a schematic isometric view illustration of a basic transferring apparatus 10 in accordance with embodiments of the invention. Transferring apparatus 10 is configured to allow transfer of pipelines and wires of different kinds and for different usages into a shelter, while keeping the shelter sealed for gas, liquids and blast over pressure and resist motive force and blast reflected pressure in accordance with one possible embodiment of the invention. For simplicity of explanation apparatus 10 is shown without the shelter wall that it is integrated into it. In general, transferring apparatus 10 is configured to be positioned in its entirety within a wall or ceiling of a shelter. Apparatus 10 comprises a pipe 120 that can be used for transferring pipeline, wiring, and for transferring water pipes. The inner opening of pipe 120 is facing the shelter inner space and is covered by a proprietary sealing gasket 132 that allows maintaining the shelter sealed. Sealing gasket 132 is further tightened to the inner opening by two strong surfaces on each side, plate 134 that is fastened toward sealing gasket 132 and the shelters' wall in which pipe 120 is integrated, and further fastened by at least one screw 130 tightened by at least one nuts 131. The length of pipe 120 is preferably similar to the thickness of the concrete wall of the shelter. The outer opening of pipe 120 is positioned outside the shelter and may also be sealed with sealing gasket 132 tightened with a tightening plate or outer box (not shown). In accordance with embodiments of this invention, additional layer made of any kind of material may be positioned between tightening plate 134 and sealing gasket 132. Pipe 120 is covered by concrete or any other strong material that composes the shelters' wall and inserted within the metal net of the enforced concrete infra structure in walls that comprise such metal infra structure. Therefore, it enables to maintain the strength of the shelters' wall in contrast to other transferring devices available in the market that force cutting the inner metal net of the enforced concrete resulting in a weakened walls. The apparatus provided herein allowed maintaining the structure of the shelters' wall whole. Thus, the stability to motive force and blast reflected pressure and impermeability to gas, liquids and blast over pressure of the shelter is not interfered although wires and piping from the outside are inserted into the shelter. The usage of the transferring apparatus 10 may combine more than one pipe in accordance with the systems to be inserted into the shelter. Various examples for air condition and communication systems will be described in detail herein below.

Figure 1B:
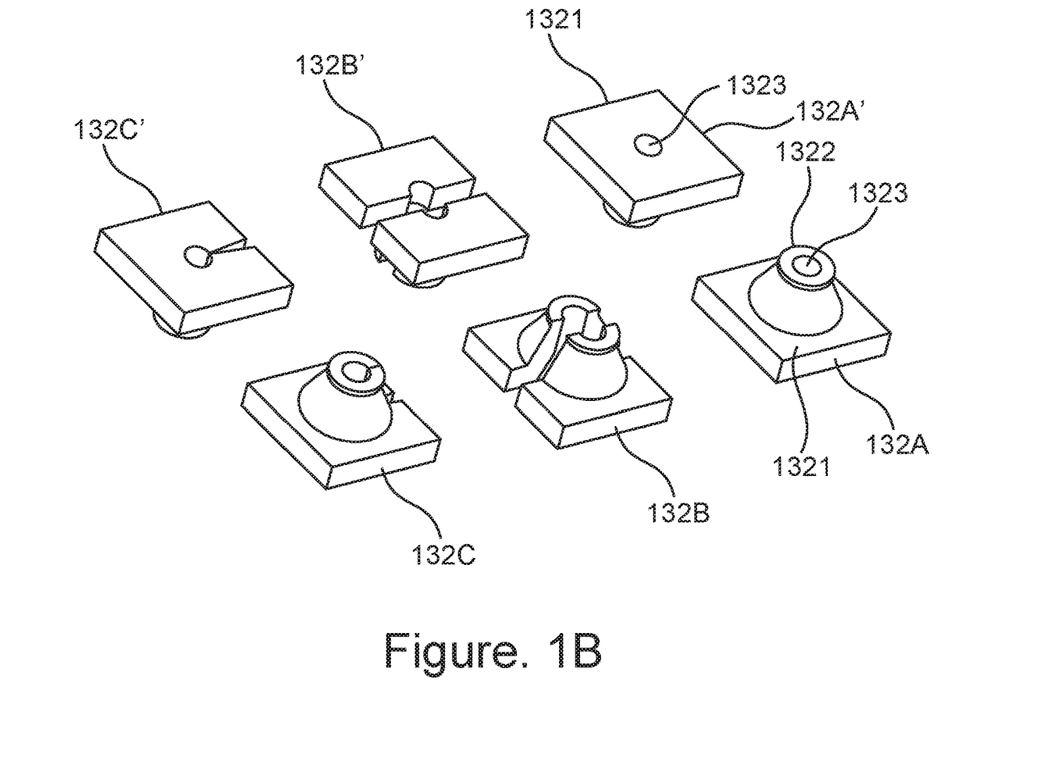
FIG. 1B is a schematic illustration of three optional variations of fastening gaskets viewed from top and from the bottom in accordance with embodiments of the invention.

FIG. 1B is a schematic illustration of three optional variations of sealing gaskets viewed from top and from the bottom in accordance with embodiments of the invention; the sealing gasket allows to maintain the shelter sealed to gas and liquids. In accordance with embodiments of the invention sealing gasket 132 comprises a flat bottom part 1321 with a hole 1323, preferably but not necessarily at its center, and an upper trimmed cone like protrusion 1322 positioned onto the plat bottom part with the trimmed narrow end and hole 1323 on top, wherein through hole 1323 the pipelines and wiring are being transferred. Sealing gasket 132 is preferably composed of flexible strong material with high stability to pressure. Sealing gasket 132 may be positioned in one end of the pipe or in both ends of the pipe and it can be positioned in both orientations on it upper side with the protrusion facing the pipe or oppositely, facing the tightening plate. In some other embodiments, the sealing gasket may have different shapes, such as but not limited to two trimmed cones connected at their base, pyramid shape, sphere shape and the like.

In more detail, sealing gasket is preferably made of a flexible material, with an opening (hole) along the pipeline and wiring pathway that are inserted and passing through it. The gasket structure is sloped in a changeable angle (none linear) at one side and flat from the other side. Alternatively, the gasket structure may be sloped in a changeable angle on both sides. The tips of the gasket are trimmed and create a changeable plane relative to the cross section of the pipeline/wiring that is aimed to pass through it.

In this drawing, gasket 132A and 132A' show one optional structure from top and bottom respectively. In this embodiment the sealing gasket structure is whole Sealing gasket 132B and 132B' show one another optional structure from top and bottom respectively, in which, the sealing gasket is split into two parts to allow more flexibility against pressure of motive force blast over pressure, and blast reflected pressure, and for efficient installation. Sealing gasket 132C and 132C' show one additional optional structure from top and bottom perspective respectively, in which the gasket is cracked to allow more flexibility against motive force blast over pressure, and blast reflected pressure, and for efficient installation.

Figure 2A:
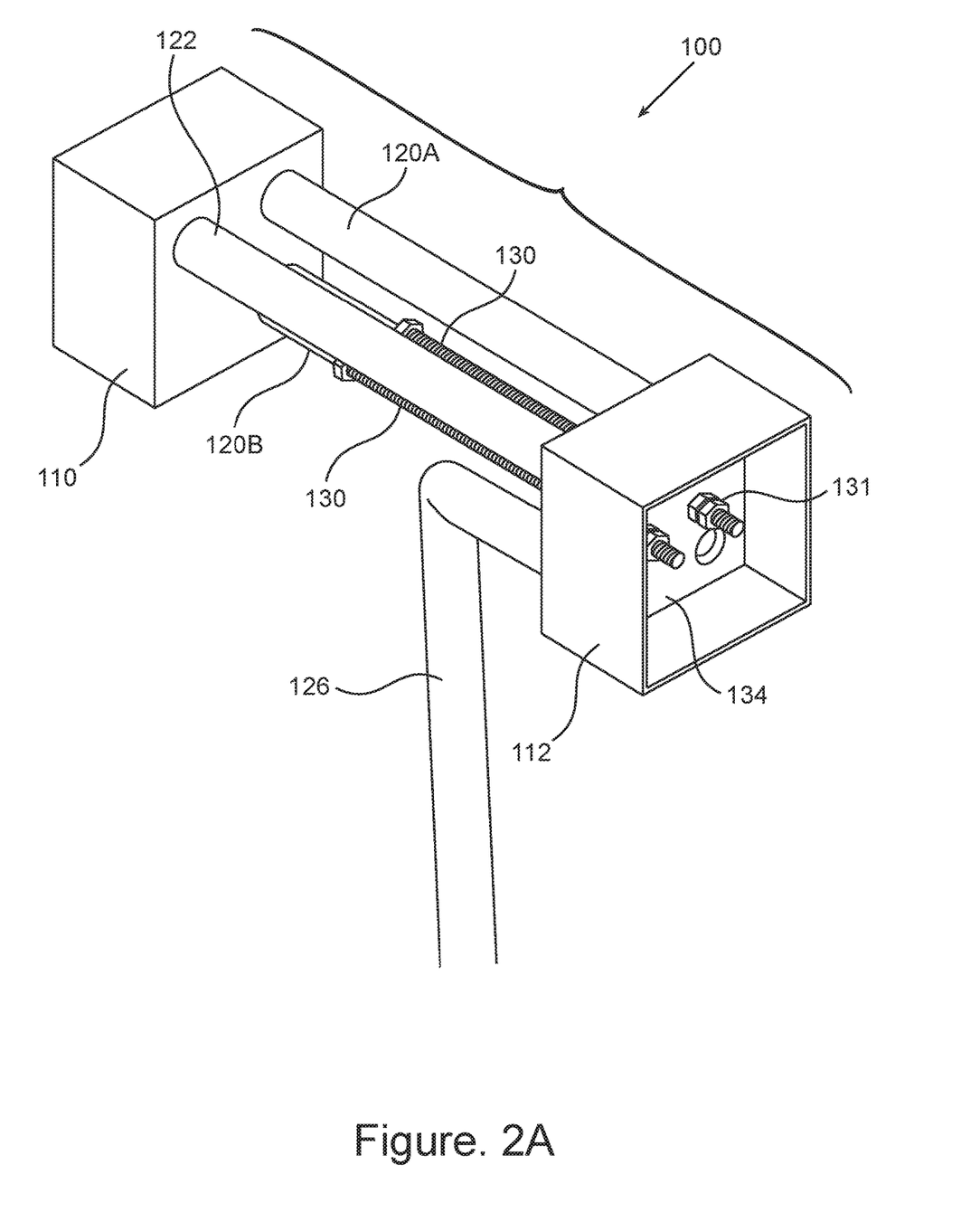
FIG. 2A is a schematic isometric view illustration seen from within the shelter, of an example of a novel transferring apparatus for transfer of wiring of air condition pipeline, electricity and drainage for installation in shelters that allows maintenance of impermeability for gas, liquids and blast pressure and motive force, shrapnel penetration and blast reflected pressure, in accordance with one possible embodiment of the invention.
Figure 4:
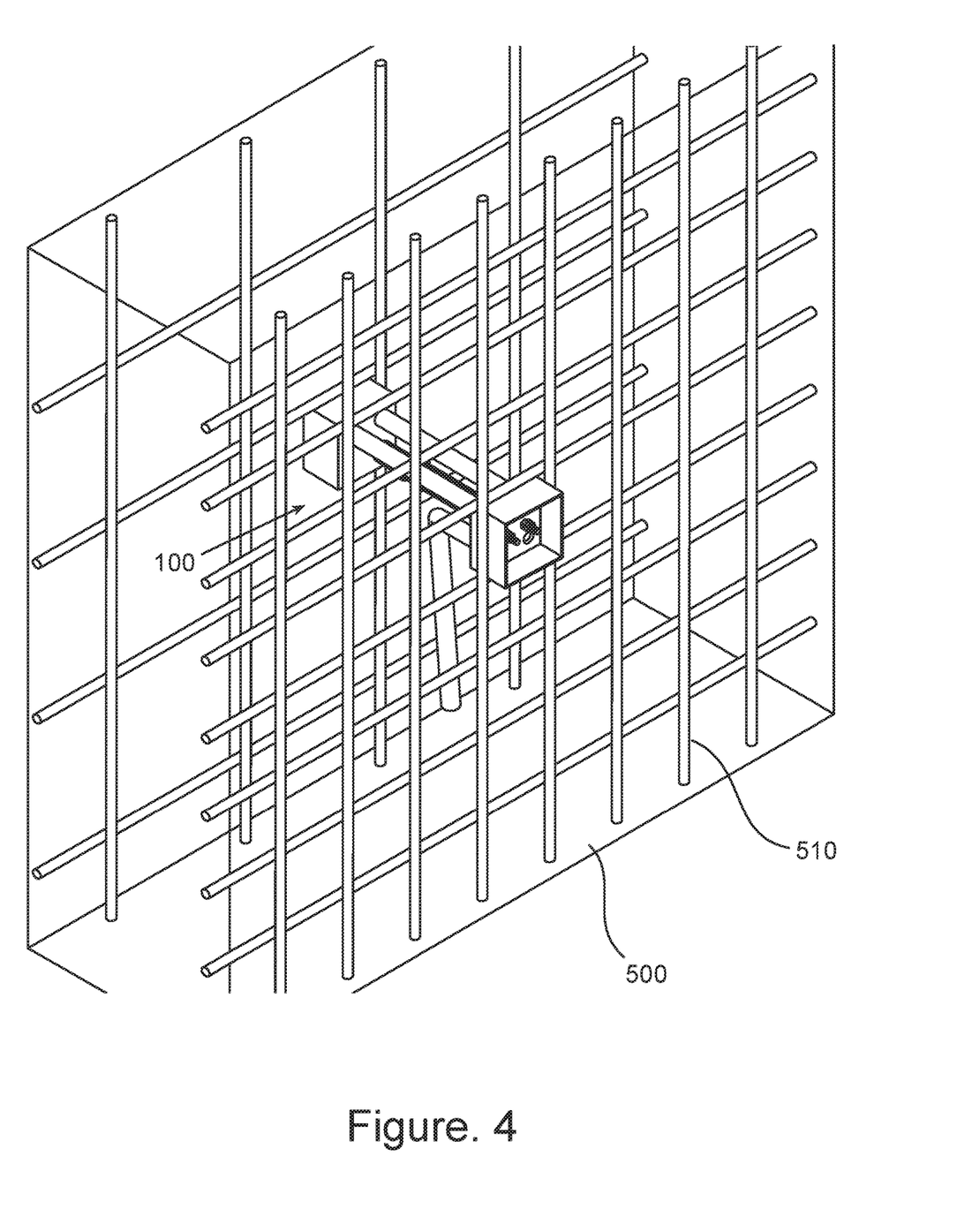
FIG. 4 is a schematic illustration of the novel transferring apparatus for transfer of constellation of air condition pipeline, wiring and drainage of FIG. 2A positioned within a wall of a shelter.

FIG. 2A is a schematic isometric view illustration seen from within the shelter, of one optional example of transferring apparatus 100 for delivering wires of air condition pipeline, electricity and else, for installation in shelters that allows maintenance of impermeability for gas, liquids and blast over pressure and resist motive force and blast reflected pressure, in accordance with one possible embodiment of the invention. For simplicity of explanation apparatus 100 is shown without the shelter wall/ceiling that it is integrated into it. In general, transferring apparatus 100 is composed of several units of apparatus 10 of FIGS. 1A and 1t is configured to be positioned in its entirety within a wall of a shelter (the positioning of the apparatus is shown in FIG. 4). In the example illustrated in this figure, the most exterior end of transferring apparatus 100 is defined by an entry frame 110 positioned at the outer side of the shelter wall, that allows insertion of various pipes for different usages from outside the shelter into it. Entry frame 110 comprises at least holes in dimensions suitable for the pipes that are designed to be inserted through it. The most internal end of transferring apparatus 100 is defined by exit frame 112 that is positioned at the most inward part of the shelter wall, facing the shelter inner space and configured to allow transfer of the pipes into the shelter inner space. Exit frame 112 comprises holes for pipes that comprise the pipelines and wires of the various systems installed within the shelter, and additional holes for tightening screws. In the specific example illustrated in this drawing, transferring apparatus 100 further comprise two pipes for gas pipeline 120A and 120B, a pipe for electronics wiring 122, a pipe for drainage of the air conditioning system 126 that is directed to the ground, at least one screw 130 for tightening the apparatus to the concrete wall with at least one nuts 131, and some additional components such as fastening gaskets and tightening palate that are shown in FIG. 2C and covered in this view by exit frame 112.

The rare side of entry frame 110 and the front side of exit frame 112 may be covered by a cover. Alternatively, the front side of exit frame 112 that turns into the shelter's space, may be covered by air condition. One of the major advantages of transferring apparatus 100 is that it becomes an integral part of the wall, it doesn't disturb the internal structure of the shelters' wall and additionally, the concrete pour is performed onto it in a manner that each pipe mentioned above is surrounded by concrete. As such, the stability to motive force, blast reflected pressure and shrapnel penetration of transferring apparatus 100 is high.

Figure 2B:
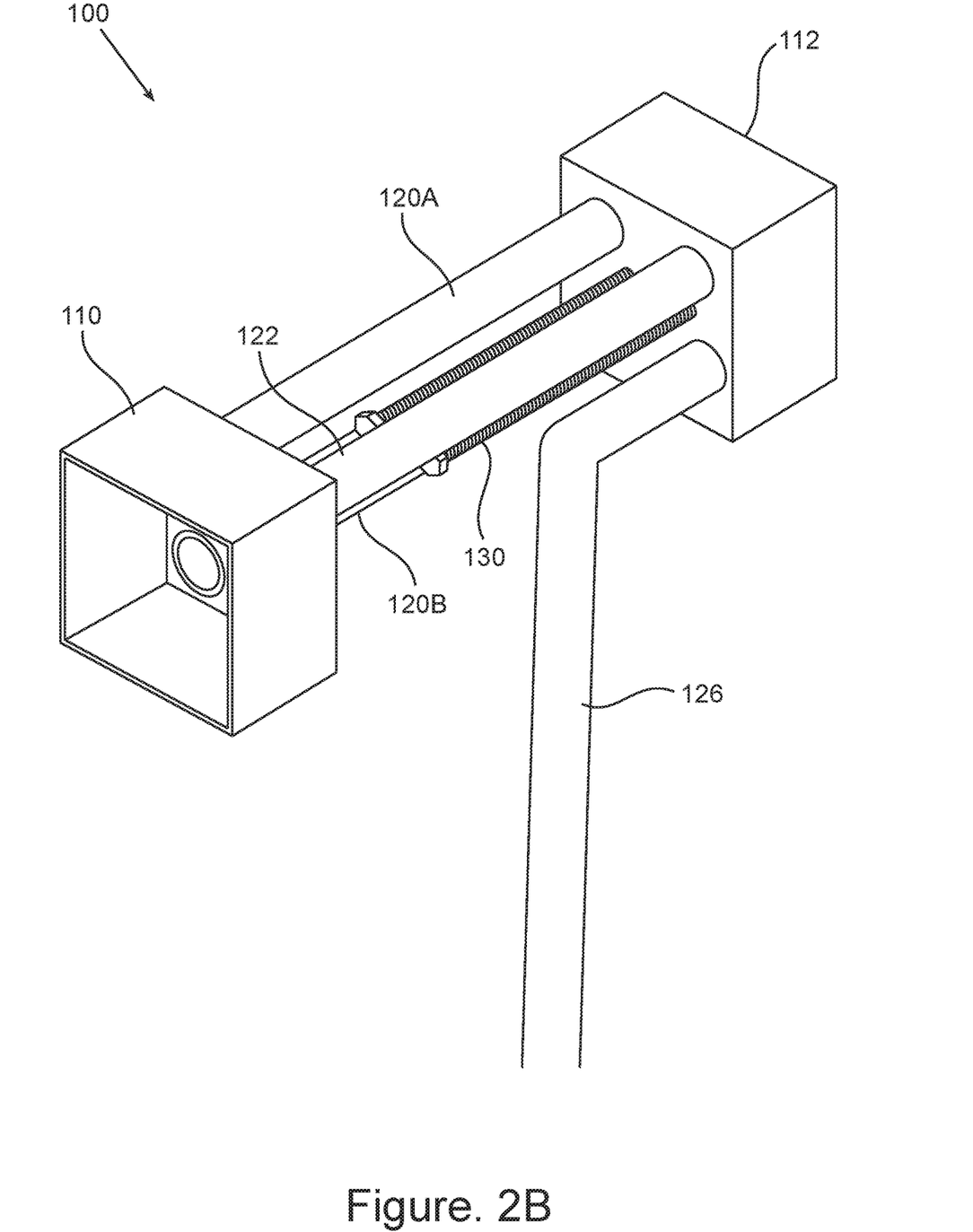
FIG. 2B is a schematic isometric view illustration seen from outside the shelter, of the example of the novel apparatus for transfer of wiring of air condition pipeline of FIG. 2A.

FIG. 2B is a schematic isometric view illustration of transferring apparatus 100 view from outside the shelter. From this view, the rare side of entry frame 110 is shown. Also shown are all the pipes that are being positioned between entry frame 110 and exit frame 112, that functionally allows to transfer the different piping and wires from the outside into the shelter, including pipes 120A and 120B for gas pipeline, pipe 122 for electrical wiring and pipe 126 for drainage of the air conditioning system that is directed to the ground. It should be clear that additional pipes for transferring other systems from the outside into the shelter may be added according to the need, and the number of pipes and holes in the entry and exit frames may change accordingly. Also shown in this figure, are two tightening screws 130, and exit frame 112 from back rear.

Figure 2C:
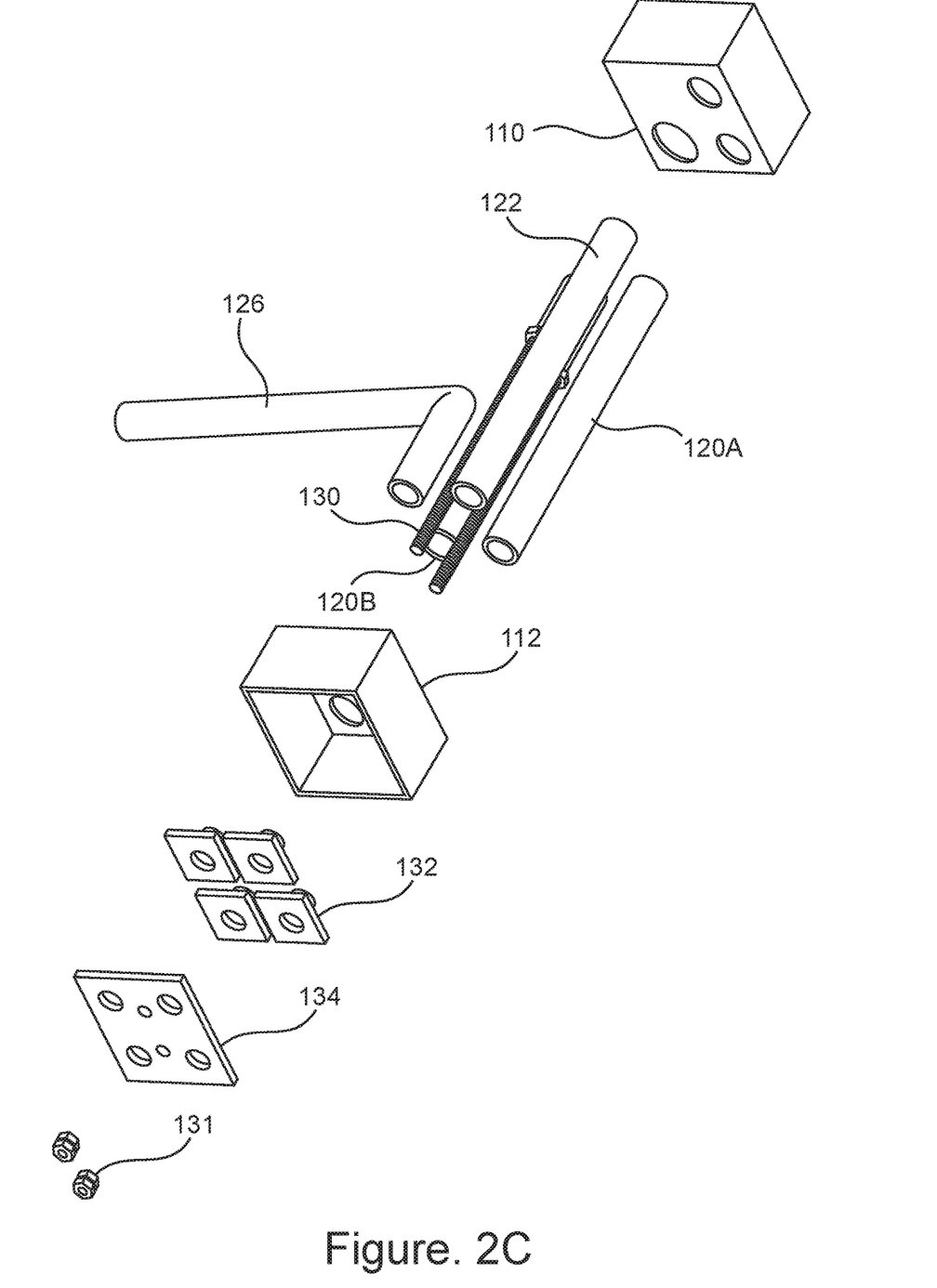
FIG. 2C is an exploded view illustration of the novel apparatus for transfer of air condition pipeline, wiring and drainage illustrated in FIG. 2A.

FIG. 2C is an exploded view illustration of transferring apparatus 100 of FIG. 2A. In the specific, none limiting example illustrated in this figure entry frame 110 is shown with 3 dedicated holes: two for gas pipeline and one for electricity wires. Entry frame 110 is configured to allow the entrance of pipeline and wires into the shelter. Its rear side turns into the surroundings of the shelter and it is preferably cast within the shelter's wall. Pipes 120A and 120B for transfer of gas pipeline, pipe 122 for transfer of electrical wires and pipe 126 for drainage of the air conditioning system are also shown. These pipes connect the entry frame 110 with the exit frame 112. Also shown are two tightening screws 130 that functionally fasten the fastening gaskets 132 and tightening plate 134 with exit frame 112 and the concrete wall. Pipeline 126' (not shown) that is positioned within sleeve 126 is used for drainage of the air conditioning and is connected to the drainage system of the building or the construction in which the shelter is founded. Also shown in this view are exit box 112 with dedicated holes for the pipes and for the tightening screws that are functionally configured together with nuts 131, to fasten fastening gaskets 132 and tightening plate 134 to exit frame 112 and the enforced concrete wall of the shelter. Fastening gaskets 132 may be used in both orientations and are functionally configured to prevent entry of gas, liquids and blast over pressure into the shelter as described in detail with reference to FIG. 1C above.

To further provide high stability and impermeability, tightening plate 134 further covers fastening gaskets 132 and create additional protection layer for avoidance of gas, liquids and blast over pressure penetration and additional strength for blocking motive force and blast reflected pressure.

Figure 3:
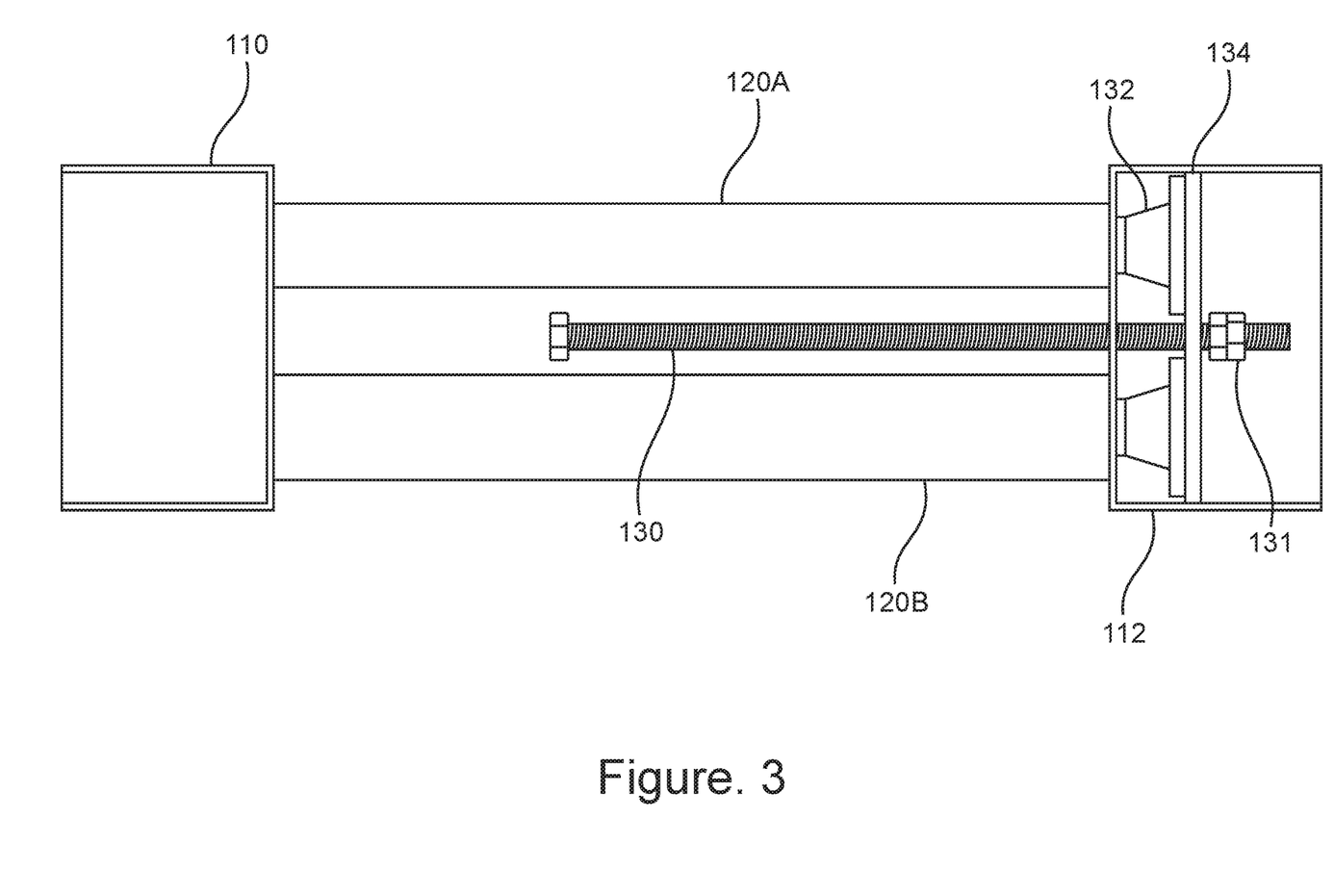
FIG. 3 is a longitudinal cross section view of the novel apparatus for transfer of air condition pipeline, wiring of electricity and drainage illustrated in FIG. 2A.

FIG. 3 is a longitudinal cross section view of transferring apparatus 100 for transfer of air condition pipeline and wiring of electricity of FIG. 2A.

In this view the positioning of gaskets 132 and tightening plate 134 within exit frame 112 and their fastening by screws 130 and nut 131 are shown. This unique structure allows high sealing of the shelter to entrance of gas, liquids and blast over pressure. Also shown in this view are entrance frame 110 and pipes 120A and 120B for the gas pipelines.

FIG. 4 is a schematic illustration of transferring apparatus 100 of FIG. 2A positioned within an enforced concrete wall 500 of a shelter. As shown in this drawing, transferring apparatus 100 is positioned in between the vertical and horizontal metal rods that create an infra structure of a metal net within the concrete wall. The metal net created within the concrete wall is configured to provide the shelters' wall high flexibility and stability for motive force and blast reflected pressure and further prevent or minimize the chances for penetration of shrapnel during shelling. The distance between the metal rods is usually regulated and determined by the military standards in each country. Since, transferring apparatus 100 is positioned in between the vertical and horizontal metal rods of the enforced concrete wall, the stability of the wall is maintained upon integration of apparatus 100 into the shelter's wall.

Figure 5A:
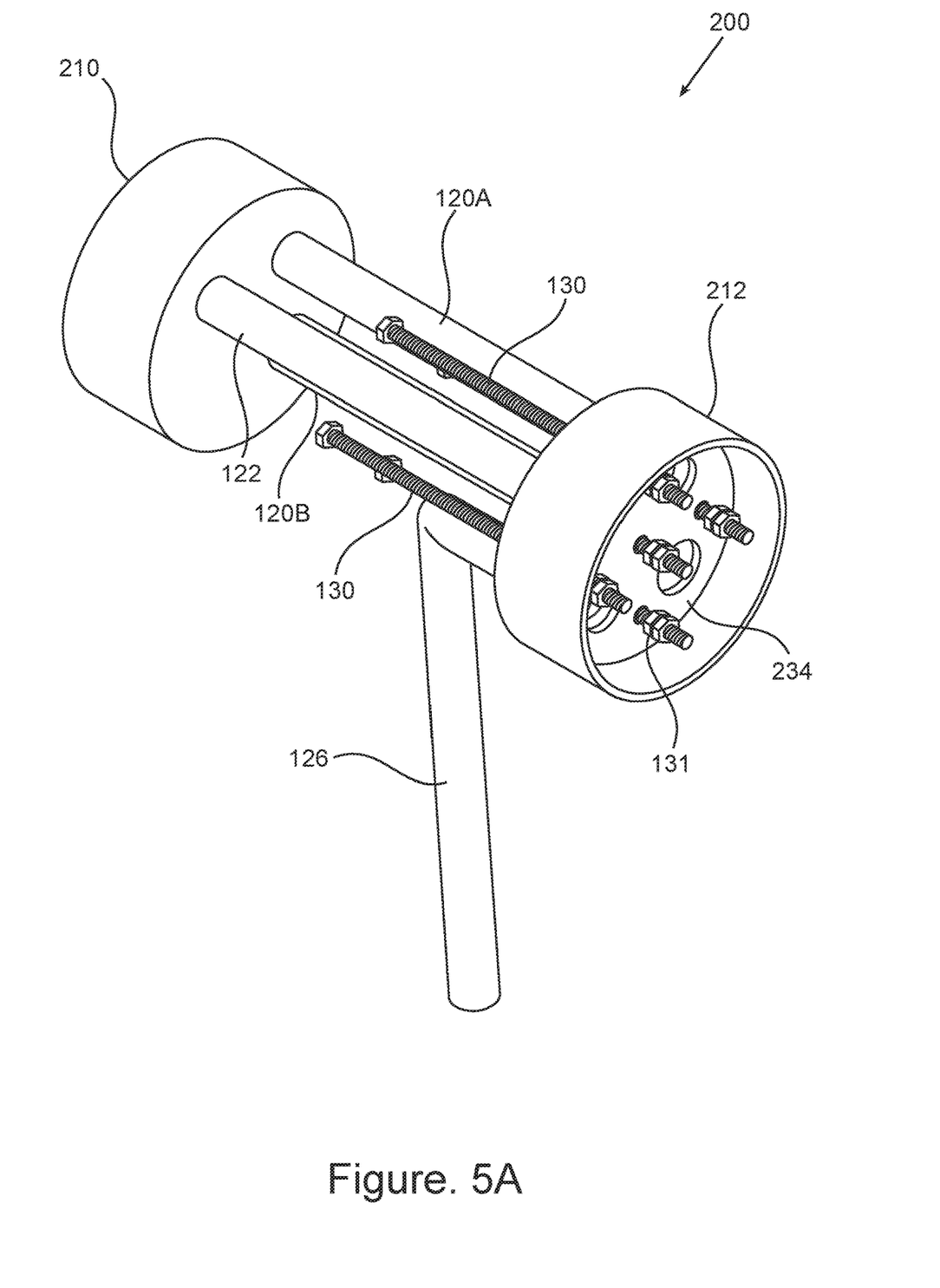
FIG. 5A illustrates an apparatus with round shaped entry and exit frames.
Figure 5B:
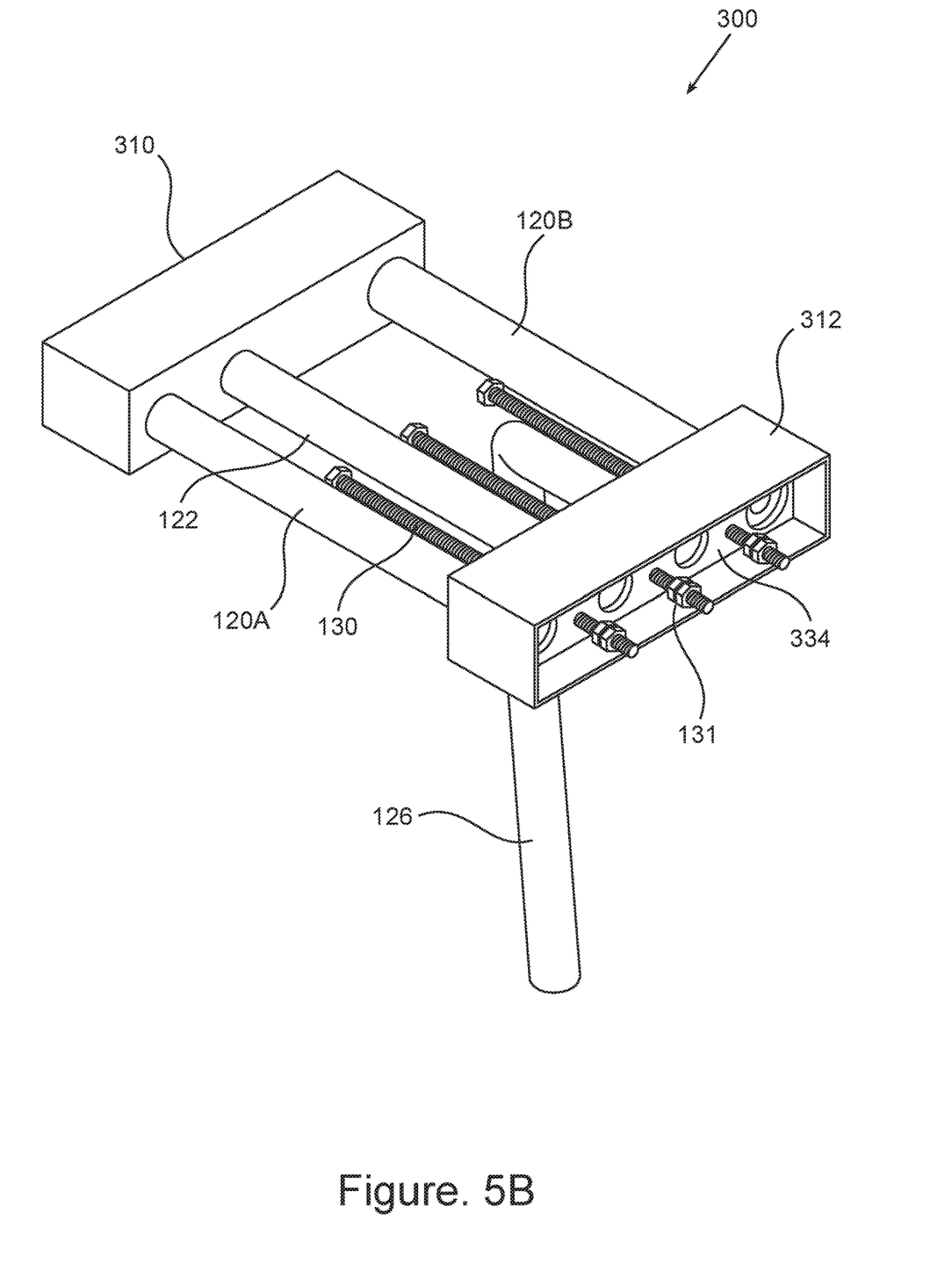
FIG. 5B illustrates an apparatus with rectangle shaped inner and outer boxes.

FIGS. 5A-5D are schematic illustrations of additional variations of transferring apparatus for transfer of wiring of air condition pipeline, and other communication, electrical and water systems in accordance with embodiments of the invention. FIGS. 5A-5B illustrate transferring apparatus 200 having a round shaped entry frame 210 and exit frame 212 and transferring apparatus 300 with rectangle shaped entry frame 310 and exit frame 312. All other components are similar to the components illustrated in FIG. 2A including pipes 120A and 120B for gas pipeline, pipe 122 for electronics wiring, pipe 126 for drainage of the air-conditioning system, tightening screws 130 and nuts 131, fastening gaskets 132 (not shown) and tightening plates 234 having a round shape similar to the shape of exit frame 212, and tightening plate 334 that a round shape similar to the shape of exit frame 312.

Figure 5C:
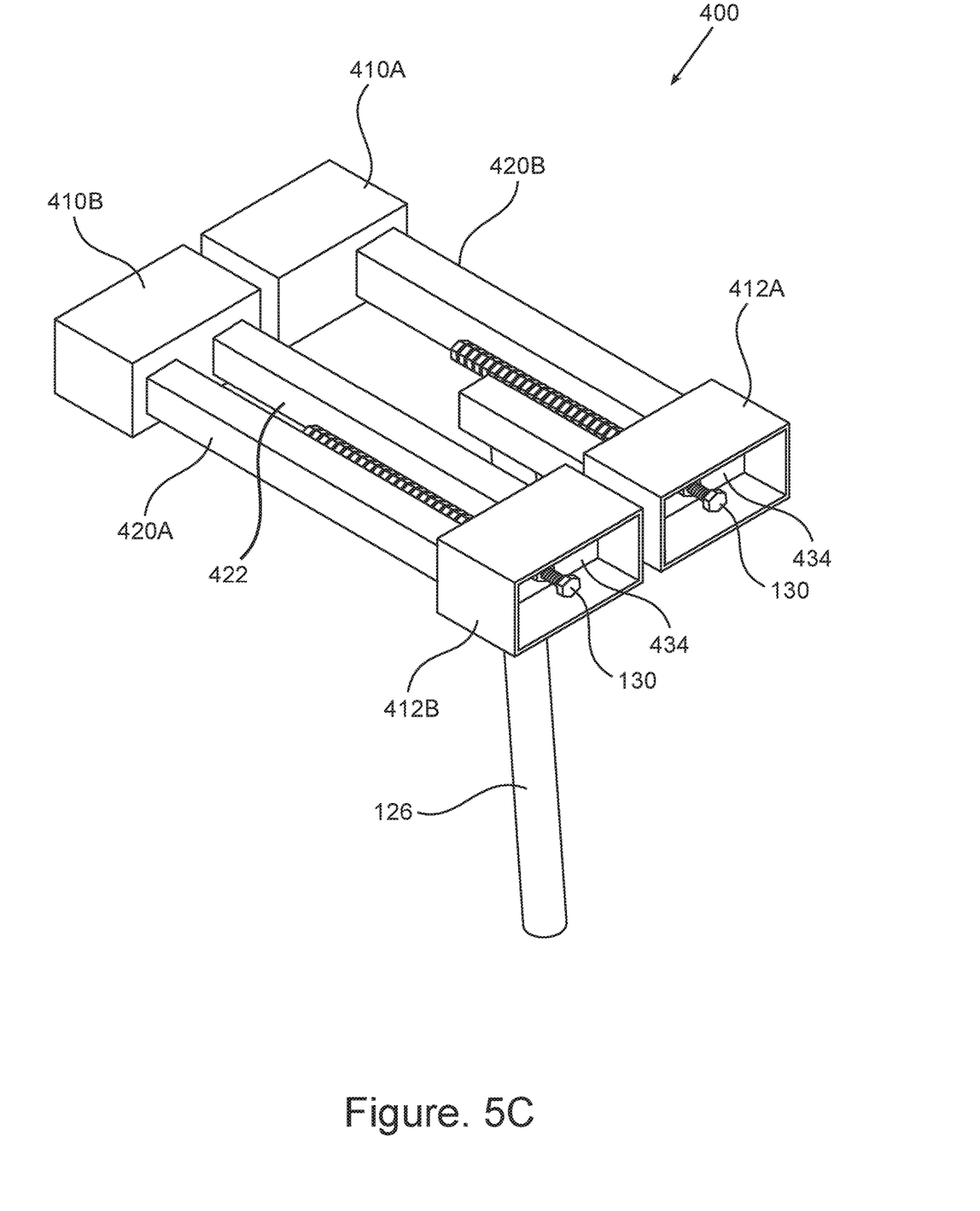
FIG. 5C illustrates an apparatus with double set of rectangular shaped inner and outer boxes.

FIG. 5C illustrates transferring apparatus 400 with double set of rectangular shaped entry frames 410A and 410B; and exit frames 412A and 412B. In this specific embodiment pipes 420A and 420B for gas pipeline have a square shape and positioned in separated frames. Pipe 422 for electronics wiring has also a square shape, while pipe 126 for drainage of the air-conditioning system having a round shape, tightening screws 130 is positioned in an opposite direction from screw 130 illustrated in FIG. 2A, and it is inserted from the inner side of the shelter. Tightening plates 434 have similar shape as exit frames 412A and 412B such that sealing will be high.

Figure 5D:
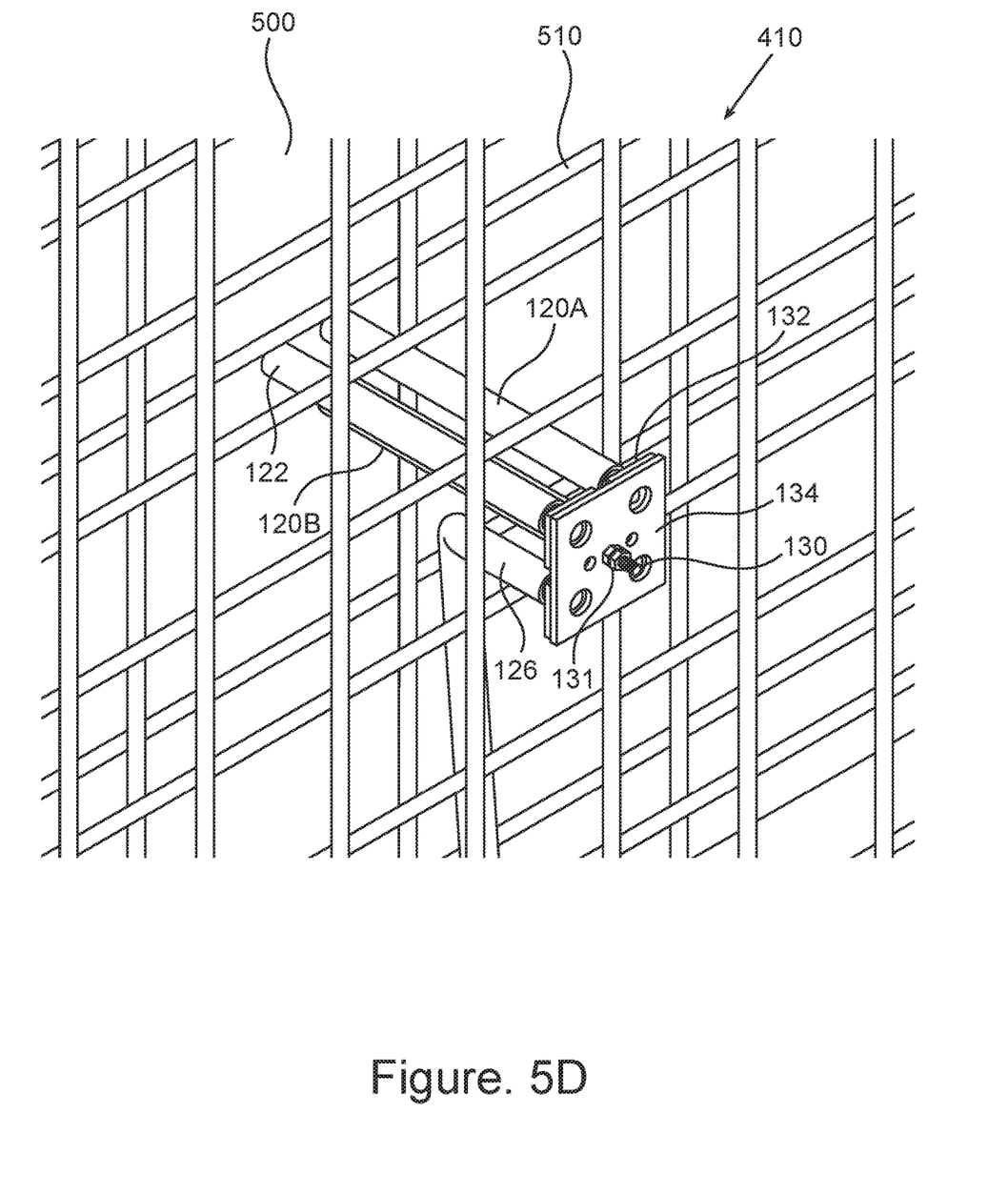
FIG. 5D illustrates an apparatus with without inner and outer boxes.

FIG. 5D illustrates additional variation of transferring apparatus 100 of FIG. 2A that contains no entry frame and no exit frame. In this embodiment, the pipes are all positioned within the metal net of the concrete wall and connected at their inner side toward the inner space of the shelter to gaskets 132 and to tightening plate 334 to which they may be further secured by a tightening screw 130 and nut 131.

Figure 6A:
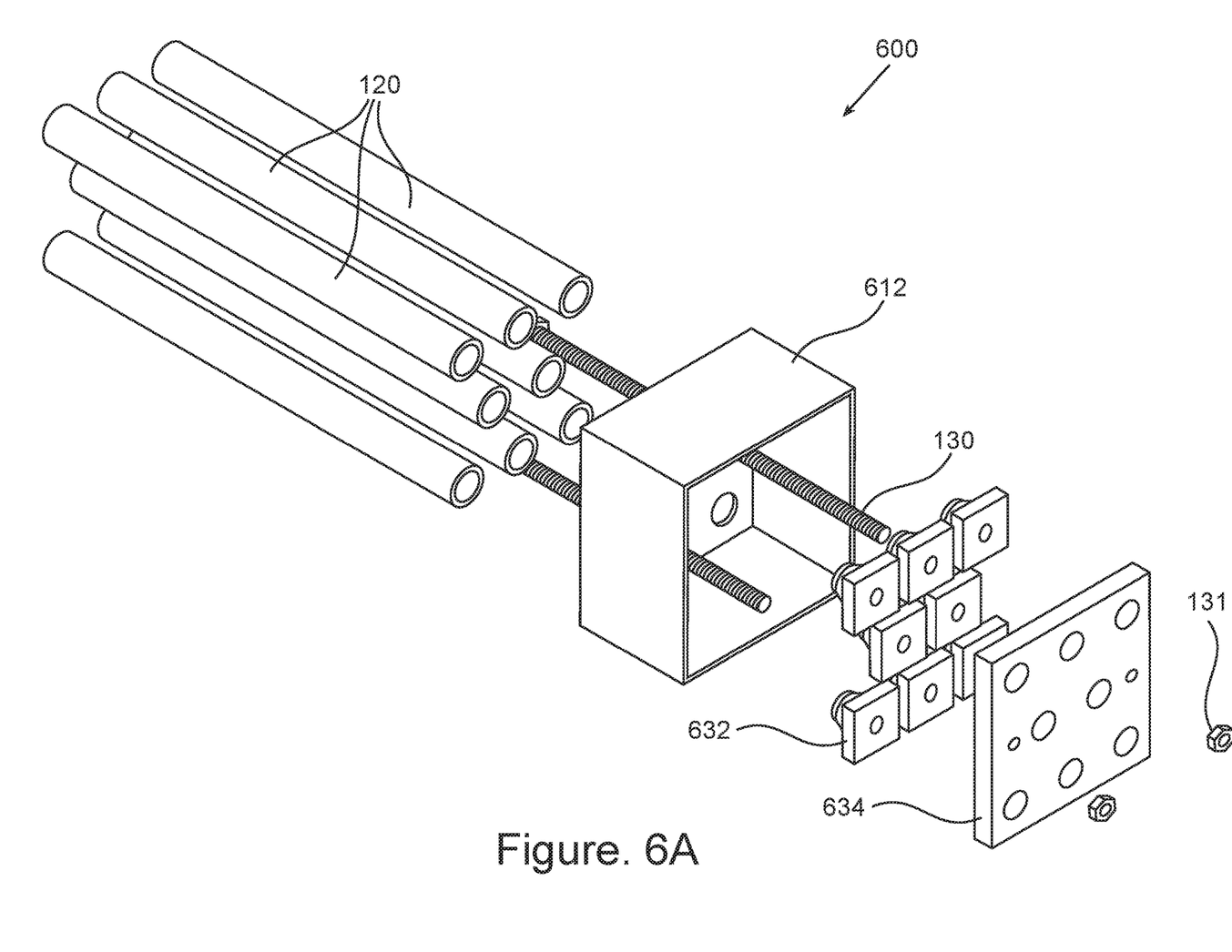
Figure 6B:
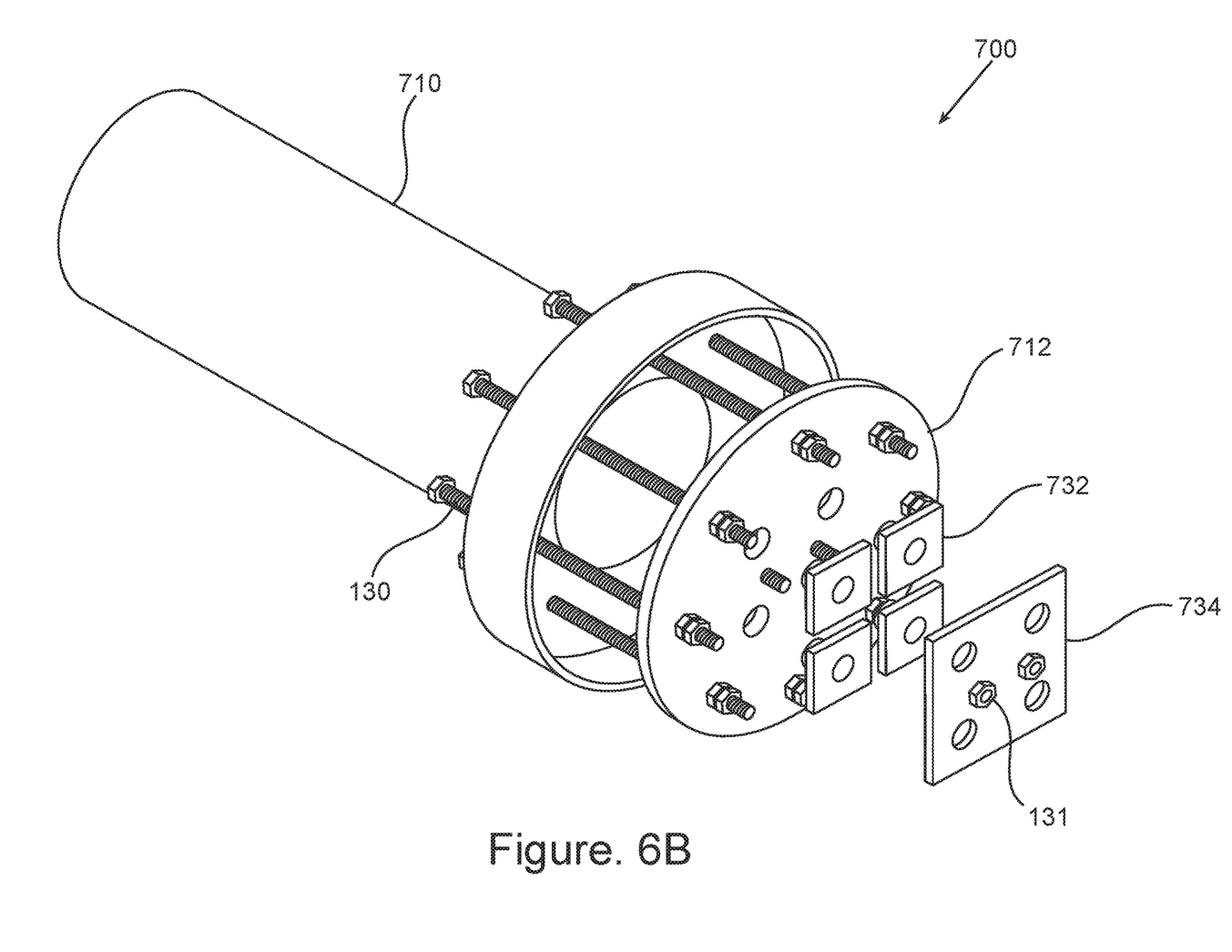
FIG. 6B illustrates transferring apparatus suitable for installation on a steal base that is preinstalled in a shelter.

FIGS. 6A-6B are schematic illustrations of two optional implementation of the transferring apparatus of the invention for transferring wires and pipelines of various systems and functionalities.

FIG. 6A illustrates a transferring apparatus 600 that comprises a bundle of pipes 120 suitable for installation of communication and electrical wires for multiple systems within a shelter. Multiple pipes 120 are inserted through exit frame 612 that is positioned at the most inward part of the shelter wall, facing the shelter inner space and configured to allow transfer of the wire through pipes 612 into the shelter inner space. Exit frame 112 comprises holes for all pipes 612 at the exact dimensions and positioning. Each hole with a pipe is assembled with a sealing gasket 632 that is further tightened by tightening plate 634 and fastened to the concrete wall and exit frame 612 by at least one screw 130 for tightening the apparatus to the concrete wall with nuts 131.

FIG. 6B illustrates a transferring apparatus 700 comprising a steal base 710 that is preinstalled in a shelter. All pipelines and wires are transferred through steal base 710 and exit into the shelter room via exit frame 712 that is secured to steal base 710 by plurality of screws 130. In this specific example, exit frame 712 is installed onto a steal material rather than on concrete as in previous FIGS. 1A-6A described above. Each pipe exiting from the holes in exit frame 712 is covered with sealing gasket 732 that is further tightened by tightening plate 734 and fastened by screws 130 locked with nuts 131.

The present invention is also directed to a method for transferring pipelines and/or wires into a shelter, while keeping the shelter sealed and impermeable for gas, liquids, blast over pressure, resist motive force, and blast reflected pressure, said method comprising: (a) Inserting at least one pipe into a shelter's wall concrete for transferring trough it at least one of a gas pipeline, a water pipeline, and wires from the surroundings into the shelter; (b) Assembling at least one sealing gasket on at least one opening of said pipe; said sealing gasket is made of a flexible material, and having a flat bottom base and an upper trimmed cone like protrusion in a changeable angle slope, wherein, said bottom base and upper trimmed cone like protrusion having a hole through which the pipelines and wires are being inserted; (c) Positioning at least one fastening plate onto said sealing gasket for fastening toward the opening of said pipe and the shelter's wall surrounding the pipe; and (d) Inserting at least one fastening screw from the outer side of the shelter's wall inward or vice versa into the fastening plate, and securing it by at least one nut for tightening the sealing gasket and the fastening plate over the opening of said pipe; and wherein, the pressure created by said sealing gasket, tightening plate and fastening screw over the pipes' opening enables entry of content into the shelter only through the pipe.

This method is suitable for transferring pipelines and/or wires into the shelter's wall when it is made of concrete, and the pipe length is determined according to the concrete wall thickness of the shelter. Preferably, the pipe is configured to transfer either one of gas pipeline, drainage pipeline, water pipeline, and wires pipeline, and the wires are either one of electricity or communication wires.

In some embodiments, the method further comprising a step of inserting of at least one frame integrated into the shelter's wall, said frame comprise holes for positioning of the at least one pipe through it for gathering more than one pipe in a predetermined proximity to each other. The frame may be positioned at the entry side of the shelter's wall and an additional frame positioned at the exit side of the shelter's wall facing the inner space of the shelter such that, each pipe is inserted through dedicated holes in each of the frames for creating an arranged transferring structure within the shelters' wall. In a specific embodiment, the frames comprise at least four holes for positioning of four pipes for air condition system installation within the shelter, the four pipes are configured to transfer two pipelines for gas, one pipeline for electricity wires and one pipeline for drainage.

In accordance with variations of the invention the at least one pipe, at least one sealing gasket, at least one fastening plate, at least one fastening screw and at least one nut in the above method, are positioned in between the metal rods of the reinforced concrete wall of the shelter, thereby maintaining the inner structure of said reinforced concrete wall whole.

Optionally, the gasket may have a trimmed slope in a changeable angle on both sides. In some further variations, plurality of pipes are being gathered by an exit frame positioned at the inner side of the reinforced concrete wall toward the inner space of the shelter for installation of communication and electrical wires for multiple systems within the shelter.

Additionally, the method for transferring pipelines and/or wires into a shelter as described above, further comprising the following steps: (e) preinstalling a steal base in the shelter's wall to allow transfer of various pipelines, and; (f) installing an exit frame with multiple holes for passage of each pipeline positioned at the inner side of the reinforced concrete wall toward the inner space of the shelter and secured to the steal base by plurality of tightening screws, wherein, each pipeline exiting from the holes in exit frame is covered by a sealing gasket that is further tightened by a tightening plate and fastened by screws locked with nuts.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

The invention claimed is:

1. A transferring apparatus for transfer of pipelines and/or wires into a shelter, while keeping the shelter sealed and impermeable for gas, liquids, blast over pressure, resist motive force, and blast reflected pressure, said apparatus comprising:
   a. at least one pipe integrated into a shelter's wall for transferring trough it at least one of a gas pipeline, a water pipeline, and wires from the surroundings into the shelter;
   b. at least one sealing gasket configured to be assembled on at least one opening of said pipe; said sealing gasket is made of a flexible material, and having a flat bottom base and an upper trimmed cone shaped protrusion in a changeable angle slope, wherein, said bottom base and upper trimmed cone shaped protrusion having a hole through which the pipelines and wiring are being transferred;
   c. at least one fastening plate for fastening said sealing gasket toward the opening of said pipe and the shelter's wall surrounding the pipe; and d. at least one fastening screw inserted from the outer side of the shelter's wall inward or vice versa, and secured by at least one nut for tightening said sealing gasket and fastening plate over the opening of said pipe; wherein, the pressure created by said sealing gasket, tightening plate and fastening screw over the pipes' opening enables entry of content into the shelter only through the pipe.

2. The transferring apparatus according to claim 1, wherein the shelter's wall is made of concrete reinforced with one or more metal rods, and said pipe length is determined according to the concrete wall thickness of the shelter, wherein said concrete wall has an inner side facing inside the shelter and an outer side facing the outside of the shelter.

3. The transferring apparatus according to claim 1, wherein said pipe is configured to transfer either one of gas pipeline, drainage pipeline, water pipeline, and wires pipeline.

4. The transferring apparatus according to claim 3, wherein said wires are either one of electricity or communication wires.

5. The transferring apparatus according to claim 1, further comprising at least one frame integrated into the shelter's wall, said frame comprise holes for positioning of the at least one pipe through it for gathering more than one pipe in a predetermined proximity to each other.

6. The transferring apparatus according to claim 5, comprising a frame positioned at the entry side of the shelter's wall and an additional frame positioned at the exit side of the shelter's wall facing the inner space of the shelter such that, each pipe is inserted through dedicated holes in each of the frames for creating an arranged transferring structure within the shelters' wall.

7. The transferring apparatus according to claim 6, wherein said frames comprise at least four holes for positioning of four pipes for air condition system installation within the shelter.

8. The transferring apparatus according to claim 7 wherein, said four pipes are configured to transfer two pipelines for gas, one pipeline for electricity wires and one pipeline for drainage.

9. The transferring apparatus according to claim 1, wherein said gasket has a trimmed slope in a changeable angle on both sides.

10. The transferring apparatus according to claim 1, wherein said apparatus is positioned in between one or more metal rods of one or more concrete wall of the shelter.

11. The transferring apparatus according to claim 1, further comprising a plurality of pipes gathered by an exit frame positioned at the inner side of one or more concrete wall for installation of communication and electrical wires for multiple systems within the shelter.

12. The transferring apparatus according to claim 1, further comprising a steel base that is preinstalled in said shelter configured to allow transfer of various pipelines, an exit frame with multiple holes for passage of each pipeline positioned at the inner side of one or more concrete wall, and secured to the steel base by plurality of tightening screws, wherein, each pipeline exiting from the holes in exit frame is covered by a sealing gasket that is further tightened by a tightening plate and fastened by screws locked with nuts.

13. A method for transferring pipelines and/or wires into a shelter, while keeping the shelter sealed and impermeable for gas, liquids, blast over pressure, resist motive force, and blast reflected pressure, said method comprising:

a. inserting at least one pipe into a shelter's wall concrete for transferring trough it at least one of a gas pipeline, a water pipeline, and wires from the surroundings into the shelter;

b. assembling at least one sealing gasket on at least one opening of said pipe; said sealing gasket is made of a flexible material, and having a flat bottom base and an upper trimmed cone shaped protrusion in a changeable angle slope, wherein, said bottom base and upper trimmed cone shaped protrusion having a hole through which the pipelines and wires are being transferred;

c. positioning at least one fastening plate onto said sealing gasket for fastening toward the opening of said pipe and the shelter's wall surrounding the pipe; and d. inserting at least one fastening screw from the outer side of the shelter's wall inward or vice versa into the fastening plate, and securing it by at least one nut for tightening the sealing gasket and the fastening plate over the opening of said pipe; and wherein, the pressure created by said sealing gasket, tightening plate and fastening screw over the pipes' opening enables entry of content into the shelter only through the pipe.

14. The method for transferring pipelines and/or wires into a shelter according to claim 13, wherein the shelter's wall is made of concrete, and said pipe length is determined according to the concrete wall thickness of the shelter.

15. The method for transferring pipelines and/or wires into a shelter according to claim 13, wherein said pipe is configured to transfer either one of gas pipeline, drainage pipeline, water pipeline, and wires pipeline.

16. The method for transferring pipelines and/or wires into a shelter according to claim 15, wherein said wires are either one of electricity or communication wires.

17. The method for transferring pipelines and/or wires into a shelter according to claim 13, further comprising inserting of at least one frame integrated into the shelter's wall, said frame comprise holes for positioning of the at least one pipe through it for gathering more than one pipe in a predetermined proximity to each other.

18. The method for transferring pipelines and/or wires into a shelter according to claim 17, comprising a frame positioned at the entry side of the shelter's wall and an additional frame positioned at the exit side of the shelter's wall facing the inner space of the shelter such that, each pipe is inserted through dedicated holes in each of the frames for creating an arranged transferring structure within the shelters' wall.

19. The method for transferring pipelines and/or wires into a shelter according to claim 16, wherein said frames comprise at least four holes for positioning of four pipes for air condition system installation within the shelter.

20. The method for transferring pipelines and/or wires into a shelter according to claim 19, wherein said four pipes are configured to transfer two pipelines for gas, one pipeline for electricity wires and one pipeline for drainage.

21. The method for transferring pipelines and/or wires into a shelter according to claim 13, wherein said gasket has a trimmed slope in a changeable angle on both sides.

\* \* \* \* \*